United States Patent
Lu et al.

(10) Patent No.: US 9,255,780 B2
(45) Date of Patent: Feb. 9, 2016

(54) METHOD FOR MEASURING THICKNESS OF FILM ON WAFER EDGE

(75) Inventors: Xinchun Lu, Beijing (CN); Pan Shen, Beijing (CN); Yongyong He, Beijing (CN)

(73) Assignee: HWATSING TECHNOLOGY CO., LTD., Tianjin (CN)

( * ) Notice: Subject to any disclaimer, the term of this patent is extended or adjusted under 35 U.S.C. 154(b) by 521 days.

(21) Appl. No.: 13/383,555

(22) PCT Filed: Jun. 9, 2011

(86) PCT No.: PCT/CN2011/075518
§ 371 (c)(1),
(2), (4) Date: May 3, 2013

(87) PCT Pub. No.: WO2012/028007
PCT Pub. Date: Mar. 8, 2012

(65) Prior Publication Data
US 2013/0211765 A1    Aug. 15, 2013

(30) Foreign Application Priority Data

Aug. 30, 2010 (CN) .......................... 2010 1 0266786

(51) Int. Cl.
*G01B 7/06* (2006.01)
*B24B 37/013* (2012.01)
*B24B 49/10* (2006.01)
*G06F 17/10* (2006.01)

(52) U.S. Cl.
CPC ............... *G01B 7/06* (2013.01); *B24B 37/013* (2013.01); *B24B 49/105* (2013.01); *G01B 7/105* (2013.01); *G06F 17/10* (2013.01)

(58) Field of Classification Search
USPC .......................................................... 702/97
See application file for complete search history.

(56) References Cited

U.S. PATENT DOCUMENTS

| 9,138,857 | B2 * | 9/2015 | Lu et al. ............................. 1/1 |
| 2014/0002062 | A1 * | 1/2014 | Lu et al. .................. 324/207.13 |
| 2014/0148008 | A1 * | 5/2014 | Wu et al. ....................... 438/692 |

FOREIGN PATENT DOCUMENTS

| CN | 101788260 A | 7/2010 |
| CN | 102049732 A | 5/2011 |

OTHER PUBLICATIONS

Fan, Baohu, International Search Report for related PCT Application No. PCT/CN2011/075518, Sep. 15, 2011, 5 pages.
Dai, Fangxing, International Preliminary Report on Patentability from related PCT Application No. PCT/CN2011/075518, Apr. 27, 2012, 5 pages.

* cited by examiner

*Primary Examiner* — Huan Tran
(74) *Attorney, Agent, or Firm* — Perkins Coie LLP

(57) ABSTRACT

A method for measuring a film thickness of a film on an edge of a wafer, comprising: off-line detecting a film at a detection point on the wafer by a four-point probe method to obtain a real film thickness of the film at the detection point, and detecting a distance from the detection point to a center of the wafer using a length measurement, in which the detection point is located between the center of the wafer and a edge point of the wafer; detecting the film at the detection point using an eddy current transducer to obtain a detected film thickness of the film at the detection point; determining a film thickness measuring correction factor according to the real film thickness, the detected film thickness at the detection point and the distance from the detection point to the center of the wafer; and measuring the film on an edge of the wafer using the eddy current transducer to obtain a measured film thickness of the film on the edge of the wafer and correcting the measured film thickness of the film on an edge of the wafer according to the film thickness measuring correction factor to obtain a real film thickness of the film on the edge of the wafer.

12 Claims, 3 Drawing Sheets

METHOD FOR MEASURING THICKNESS OF FILM ON WAFER EDGE

This application claims priority under 35 U.S.C. 371 to, and is a U.S. National Phase application of, the International Patent Application No. PCT/CN2011/075518, filed Jun. 9, 2011, which claims the benefit of CN Application No. 201010266786.3 filed Aug. 30, 2010. The entire contents of the before-mentioned patent applications are incorporated by reference as part of the disclosure of this application.

TECHNICAL FIELD

The present disclosure relates to the field of semiconductor manufacturing, and more particularly to a method for measuring a film thickness of a film on an edge of a wafer.

BACKGROUND

With the wafer size being enlarged to 300 mm currently and even to 450 mm in the near future, the chips at the wafer edge have more influence upon the total output. Therefore, it is quite important for measuring the thickness of the film on the edge of the wafer (i.e. the film thickness of the edge of the film of the wafer) during a chemical mechanical polishing process.

Thickness and surface morphology of a copper film on the wafer are generally measured by using an eddy current transducer before or after the chemical mechanical polishing process. Generally a radius of an eddy current transducer probe is at least 6-8 mm. FIG. 1 shows a film thickness curve measured by the eddy current transducer in the prior art, in which curve 1 is a real film thickness curve, and curve 2 is a measured curve obtained by using the eddy current transducer. FIG. 2 illustrates a wafer measuring process in the prior art. As shown in FIG. 2, eddy current transducers 6 and 7 are arranged with opposing to each other, and a wafer 8 such as a silicon wafer gradually passes through the space between the eddy current transducers 6 and 7 so that the film thickness of the wafer may be detected by the eddy current transducers 6 and 7. The film thicknesses measured at positions a, b, c in FIG. 2 are corresponding to the points 5, 4, 3 on the film thickness curve of FIG. 1. In theory, the eddy current transducers receive a measuring signal so as to obtain the film thickness only when the wafer arrives at position b. However, in practical measuring processes, the eddy current transducers should have already received the measuring signal at the position a as shown in FIG. 2 before the wafer has approached the eddy current transducers. Therefore, it is difficult to accurately measure the film thickness of the film in an annular edge region within 15 mm from the outer periphery of the wafer, thus causing inaccurate film thickness measurement of the wafer.

SUMMARY

In order to overcome inaccuracy of measuring film thickness caused by signal distortion occurred during measuring a film thickness of the film on an edge of a wafer by an eddy current transducer, embodiments of the present disclosure provides a method for measuring a film thickness of the film on an edge of a wafer. The present disclosure may correct a measured film thickness curve of the film on an edge of a wafer to make it consistent with a real film thickness curve of the film on the edge of a wafer in so far as possible. The measured film thickness of the film on the edge of a wafer measured according to embodiments of the present disclosure may be used as the real film thickness of the film on the edge of a wafer, thus enhancing the accuracy of the measuring film thickness.

The method for measuring a film thickness of the film on an edge of a wafer of wafer according to embodiments of the present disclosure comprises the steps of: off-line detecting a film at a detection point on the wafer by a four-point probe method to obtain a real film thickness at the detection point, and detecting a distance from the detection point to a center of the wafer using a length measurement, in which the detection point is located between the center of the wafer and an edge point of the wafer; detecting the film at the detection point using an eddy current transducer to obtain a detected film thickness at the detection point; determining a film thickness measuring correction factor according to the real film thickness, the detected film thickness at the detection point and the distance from the detection point to the center of the wafer; and measuring the film on the edge of the wafer using the eddy current transducer to obtain a measured film thickness of the film on the edge of the wafer and correcting the measured film thickness of the film on the edge of the wafer according to the film thickness measuring correction factor to obtain a real film thickness of the film on the edge of the wafer.

In an embodiment of the present disclosure, the detection point x is located between $x_0-2D$ and $x_0$, in which $x_0$ is a distance from the edge point of the wafer on a horizontal diameter of the wafer to the center of the wafer, x is a distance from the detection point to the center of the wafer, and D is a diameter of the eddy current transducer.

In an embodiment of the present disclosure, the film thickness measuring correction factor is obtained by a formula:

$$T_r(x)' = \frac{e^{\frac{x_0-x}{d}} + e^{\frac{x-x_0}{d}}}{e^{\frac{x_0-x}{d}} - e^{\frac{x-x_0}{d}}} \cdot T_m(x)'$$

in which is the detected film thickness at the detection point x, $T_r(x)$, is the real film thickness at the detection point x, and d is the film thickness measuring correction factor.

In an embodiment of the present disclosure, the measured film thickness of the film on the edge of the wafer is corrected by a formula:

$$T_r(x) = \frac{e^{\frac{x_0-x}{d}} + e^{\frac{x-x_0}{d}}}{e^{\frac{x_0-x}{d}} - e^{\frac{x-x_0}{d}}} \cdot T_m(x)$$

in which $T_m(x)$ is the measured film thickness of the film on the edge of the wafer, $T_r(x)$ is the real film thickness of the film on the edge of the wafer, and d is the film thickness measuring correction factor.

In an embodiment of the present disclosure, the film thickness measuring correction factor is obtained by a formula:

$$T_r(x)' = \frac{\sqrt{\pi} \cdot T_m(x)'}{2\int_0^{\frac{x_0-x}{d}} e^{-t^2} dt}$$

in which $T_m(x)$, is the detected film thickness at the detection point x, $T_r(x)$, is the real film thickness at the detection point x, d is the film thickness measuring correction factor, and t is an integral variable ranging from 0 to $$\frac{x_0-x}{d}.$$

In an embodiment of the present disclosure, the measured film thickness of the film on the edge of the wafer is corrected by a formula:

$$T_r(x) = \frac{\sqrt{\pi} \cdot T_m(x)}{2\int_0^{\frac{x_0-x}{d}} e^{-t^2} dt}$$

in which $T_m(x)$ is the measured film thickness of the film on the edge of the wafer, $T_r(x)$ is the real film thickness of the film on the edge of the wafer, and d is the film thickness measuring correction factor.

Embodiments of the present disclosure have the following advantages. A mathematical model may be reconstructed based on an off-line detecting result and an actually detecting result of the film thickness so as to accurately measure the film thickness of the film on the edge of the wafer. The measuring may be performed by using a known eddy current transducer and measuring device without changing the hardware, only simple off-line calibration is required without disadvantageously affect the output of the chemical mechanical polishing apparatus.

DETAILED DESCRIPTION OF EMBODIMENTS
OF THE DISCLOSURE

Embodiments of the present disclosure are described below with reference to the drawings.

According to embodiments of the present disclosure, the accurate film thickness of a film on an edge of a wafer can be obtained by using a mathematical algorithm without making any change to existing film thickness measuring hardware.

Figure 1:
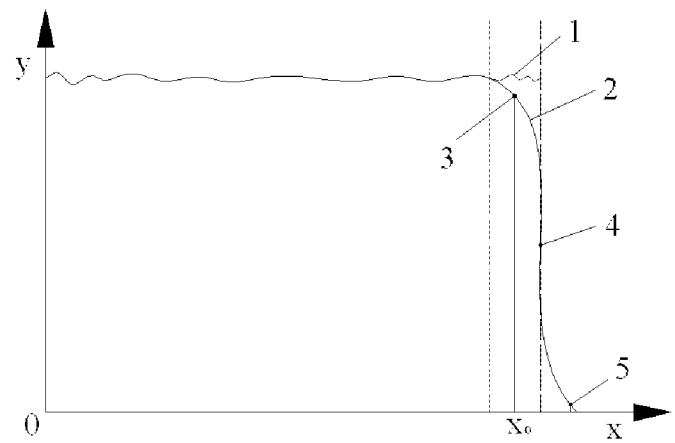
FIG. 1 shows a film thickness curve measured by an eddy current transducer in the prior art.
Figure 2:
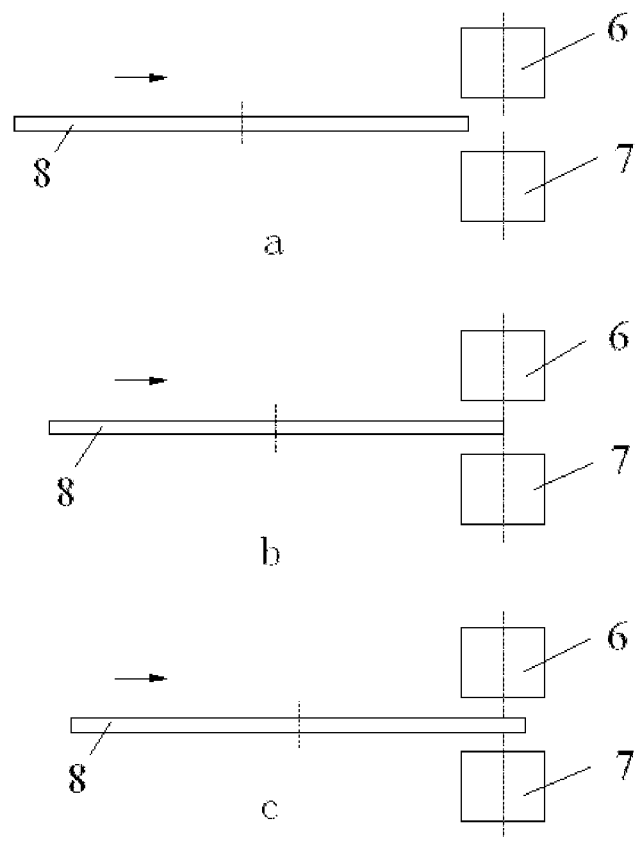
FIG. 2 shows a wafer measuring process in the prior art.
Figure 3:
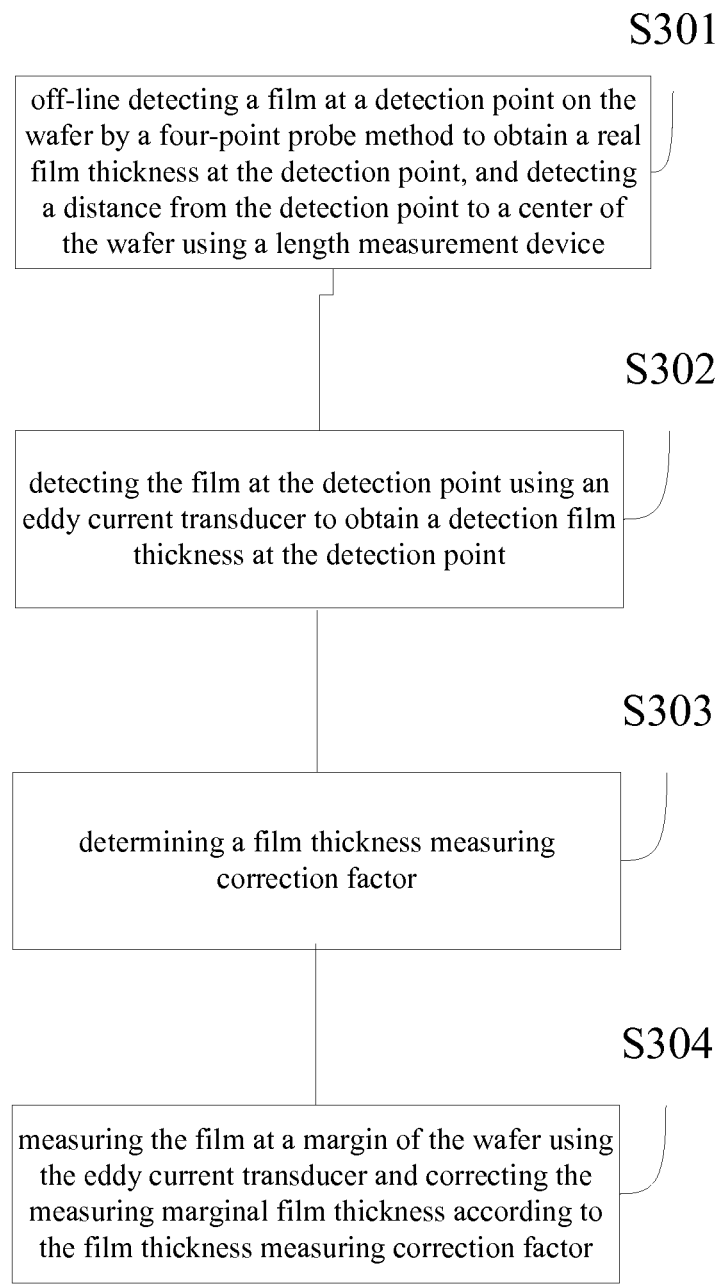
FIG. 3 is a flow chart showing a process of a method for measuring a film thickness of a film on an edge of a wafer according to an embodiment of the present disclosure.

Referring to FIG. 3, a process is illustrated for a method for measuring a film thickness of a film on an edge of a wafer according to an embodiment of the present disclosure. This method includes the following steps:

Step S301, a value of the actual film thickness ("real film thickness") at a detection point on a wafer is off-line detected by a four-point probe method, and a distance from the detection point to the center of the wafer is measured by using a length measurement device. The detection point is located between the center of the wafer and a point on the edge (also referred to edge point hereinafter) of the wafer. In some embodiments of the present disclosure, the wafer may be silicon wafer, SOI (Silicon-On-Insulator), germanium wafer, sapphire substrate, etc. The detection point x is located between $x_0 - 2D$ and $x_0$, in which $x_0$ is a distance from the edge point of the wafer on a horizontal diameter to the center of the wafer, x is the distance from the detection point to the center of the wafer, and D is a diameter of the eddy current transducer. In some embodiments of the present disclosure, there may be one or a plurality of detection points. The detection point is preferably located at the edge of the wafer. It should be noted that the edge of the wafer is generally referred to an annular edge region within 15 mm from the outer periphery of the wafer in the present disclosure, and the size (width) of the edge region may vary with the size of the wafer changing.

Step S302, the detection point is detected to obtain a detected film thickness at the detection point by using an eddy current transducer, in which $T_m(x)'$ is the detected film thickness at the detection point x, and $T_r(x)'$ is the real film thickness at the detection point x.

Step S303, a film thickness measuring correction factor is determined according to the real film thickness, the detected film thickness at the detection point and the distance from the detection point to the center of the wafer.

In some embodiments of the present disclosure, the film thickness measuring correction factor d is obtained by a formula:

$$T_r(x)' = \frac{e^{\frac{x_0-x}{d}} + e^{\frac{x-x_0}{d}}}{e^{\frac{x_0-x}{d}} - e^{\frac{x-x_0}{d}}} \cdot T_m(x)'.$$

In another embodiment of the present disclosure, the film thickness measuring correction factor d is obtained by a formula:

$$T_r(x)' = \frac{\sqrt{\pi} \cdot T_m(x)'}{2\int_0^{\frac{x_0-x}{d}} e^{-t^2} dt}.$$

It would be appreciated by those skilled in the art that changes and alternatives of the above two formulas may be made.

Step S304, the film thickness of the film on the edge of the wafer is measured by the eddy current transducer and the measured film thickness of the film on the edge of the wafer is corrected according to the film thickness measuring correction factor.

In some embodiments of the present disclosure, the measured film thickness of the film on the edge of the wafer may be corrected by a formula:

$$T_r(x) = \frac{e^{\frac{x_0-x}{d}} + e^{\frac{x-x_0}{d}}}{e^{\frac{x_0-x}{d}} - e^{\frac{x-x_0}{d}}} \cdot T_m(x),$$

in which $T_m(x)$ is the measured film thickness of the film on the edge of the wafer, $T_r(x)$ is the real film thickness of the film on the edge of the wafer, and d is the film thickness measuring correction factor determined in step S304.

In another embodiment of the present disclosure, the measured film thickness of the film on the edge of the wafer is corrected by a formula: in $$T_r(x) = \frac{\sqrt{\pi} \cdot T_m(x)}{2\int_0^{\frac{x_0-x}{d}} e^{-t^2}dt},$$

which $T_m(x)$ is the measured film thickness of the film on the edge of the wafer, $T_r(x)$ is the real film thickness of the film on the edge of the wafer, and d is the film thickness measuring correction factor.

A mathematical model of embodiments of the present disclosure is established $$T_r(x) = \frac{\sqrt{\pi} \cdot T_m(x)}{2\int_0^{\frac{x_0-x}{d}} e^{-t^2}dt} \text{ or }$$

$$T_r(x) = \frac{\sqrt{\pi} \cdot T_m(x)}{2\int_0^{\frac{x_0-x}{d}} e^{-t^2}dt},$$

in which x is the detection point which ranges between $x_0-2D$ and $x_0$, D is a diameter of the eddy current transducer, $T_m$ is the measured at the detection point x, $T_r$ is the real film thickness at the detection point x, $x_0$ is a edge point of the wafer, d is the correction factor associated with size, shape, working distance of the transducer, and t is an integral variable ranging from 0 to $$\frac{x_0-x}{d}.$$

Figure 4:
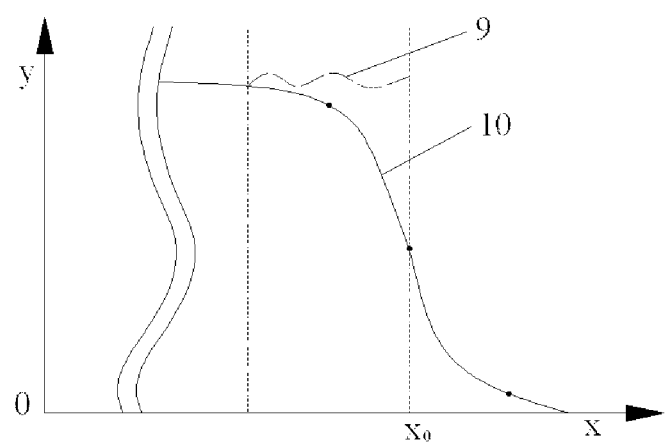
FIG. 4 is an enlarge view of a measured film thickness curve of the film on the edge of the wafer and a corrected film thickness curve of the film on the edge of the wafer according to an embodiment of the present disclosure.

The measured film thickness $T_m$ may be measured by the eddy current transducer. The real film thickness at the point x may be obtained by substituting the calibrated correction factor d, the measured $T_m$ and a coordinate of the point x into the model. As shown in FIG. 4, the curve 9 is a corrected curve of the film thickness of the film on the edge of the wafer while the curve 10 is a measured curve of the film thickness of the film on the edge of the wafer by the eddy current transducer.

Figure 5:
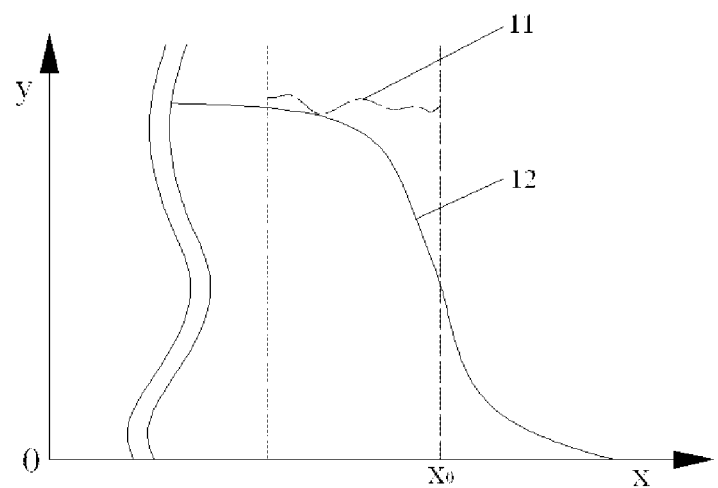
FIG. 5 shows a measured film thickness curve of the film on the edge of the wafer and a calibration film thickness of the film on the edge of the wafer curve according to an embodiment of the present disclosure.

The off-line calibration is performed with respect to the wafer by the four-point probe method so as to obtain the real film thickness $T_r$ at a specific point of the wafer. The film thickness $T_m$ of the film on the edge of the wafer may be measured by the eddy current transducer. The value of the x may be measured by an accurate measurement device such as a micrometer. As shown in FIG. 5, the curve 11 is a curve of real film thickness of the film on the edge of the wafer measured by the four-point probe method while the curve 12 is a curve of the measured film thickness of the film on the edge of the wafer measured by the eddy current transducer. The correction factor d may be obtained by substituting the x of the specific point, the measured film thickness $T_m$ of the film on the edge of the wafer and the real film thickness $T_r$ into the mathematical model of the algorithm $$T_r(x) = \frac{\sqrt{\pi} \cdot T_m(x)}{2\int_0^{\frac{x_0-x}{d}} e^{-t^2}dt} \text{ or }$$

$$T_r(x) = \frac{\sqrt{\pi} \cdot T_m(x)}{2\int_0^{\frac{x_0-x}{d}} e^{-t^2}dt}.$$

Embodiments of the present disclosure have the following advantages. A mathematical model may be reconstructed based on an off-line detecting result and an actually detecting result of the film thickness so as to accurately measure the film thickness of the film on the edge of the wafer. The measuring may be performed by using a known eddy current transducer and measuring device without changing the hardware, only a simple off-line calibration is provided to achieve the accurate measurement without disadvantageously affecting the production output of the chemical mechanical polishing apparatus.

What is claimed is:

1. A method for measuring a film thickness of a film on an edge of a wafer, comprising steps of:
   off-line detecting a film at a detection point on the wafer by a four-point probe method to obtain a real film thickness at the detection point, and detecting a distance from the detection point to a center of the wafer using a length measurement, in which the detection point is located between the center of the wafer and an edge point of the wafer;
   detecting the film at the detection point using an eddy current transducer to obtain a detected film thickness at the detection point;
   determining a film thickness measuring correction factor according to the real film thickness, the detected film thickness at the detection point and the distance from the detection point to the center of the wafer; and
   measuring the film on the edge of the wafer using the eddy current transducer to obtain a measured film thickness of the film on the edge of the wafer and correcting the measured film thickness of the film on the edge of the wafer according to the film thickness measuring correction factor to obtain a real film thickness of the film on the edge of the wafer.

2. The method according to claim 1, wherein the detection point x is located between $x_0-2D$ and $x_0$, in which $x_0$ is a distance from the edge point of the wafer on a horizontal diameter of the wafer to the center of the wafer, x is a distance from the detection point to the center of the wafer, and D is a diameter of the eddy current transducer.

3. The method according to claim 2, wherein the film thickness measuring correction factor is obtained by a formula:

$$T_r(x)' = \frac{e^{\frac{x_0-x}{d}} + e^{\frac{x-x_0}{d}}}{e^{\frac{x_0-x}{d}} - e^{\frac{x-x_0}{d}}} \cdot T_m(x)'$$

in which $T_m(x)'$ is the detected film thickness at the detection point x, $T_r(x)'$ is the real film thickness at the detection point x, and d is the film thickness measuring correction factor.

4. The method according to claim 3, wherein the measured film thickness of the film on the edge of the wafer is corrected by a formula:

$$T_r(x) = \frac{e^{\frac{x_0-x}{d}} + e^{\frac{x-x_0}{d}}}{e^{\frac{x_0-x}{d}} - e^{\frac{x-x_0}{d}}} \cdot T_m(x)$$

in which $T_m(x)$ is the measured film thickness of the film on the edge of the wafer, $T_r(x)$ is the real film thickness of the film on the edge of the wafer, and d is the film thickness measuring correction factor.

5. The method according to claim 2, wherein the film thickness measuring correction factor is obtained by a formula:

$$T_r(x)' = \frac{\sqrt{\pi} \cdot T_m(x)'}{2\int_0^{\frac{x_0-x}{d}} e^{-t^2} dt}$$

in which $T_m(x)'$ is the detected film thickness at the detection point x, $T_r(x)'$ is the real film thickness at the detection point x, d is the film thickness measuring correction factor, and t is an integral variable ranging from 0 to $$\frac{x_0 - x}{d}.$$

6. The method according to claim 3, wherein the measured film thickness of the film on the edge of the wafer is corrected by a formula:

$$T_r(x) = \frac{\sqrt{\pi} \cdot T_m(x)}{2\int_0^{\frac{x_0-x}{d}} e^{-t^2} dt}$$

in which $T_m(x)$ is the measured film thickness of the film on the edge of the wafer, $T_r(x)$ is the real film thickness of the film on the edge of the wafer, and d is the film thickness measuring correction factor.

7. A method for measuring a film thickness of a film on an edge of a wafer, comprising:
  measuring a film on a wafer at a detection point located between a center of the wafer and an edge point of the wafer to obtain a real film thickness at the detection point;
  measuring a distance from the detection point to the center of the wafer;
  detecting the film at the detection point using an eddy current transducer to obtain a detected film thickness at the detection point;
  measuring the film on the edge of the wafer using the eddy current transducer to obtain a measured film thickness of the film on the edge of the wafer; and
  applying a film thickness measuring correction factor to the measured film thickness of the film on the edge of the wafer to obtain a real film thickness of the film on the edge of the wafer, wherein the film thickness measuring correction factor is based on the real film thickness, the detected film thickness at the detection point and the distance from the detection point to the center of the wafer.

8. The method as in claim 7, wherein the detection point x is located between $x_0 - 2D$ and $x_0$, in which $x_0$ is a distance from the edge point of the wafer on a horizontal diameter of the wafer to the center of the wafer, x is a distance from the detection point to the center of the wafer, and D is a diameter of the eddy current transducer.

9. The method as in claim 8, wherein the film thickness measuring correction factor is:

$$T_r(x)' = \frac{e^{\frac{x_0-x}{d}} + e^{\frac{x-x_0}{d}}}{e^{\frac{x_0-x}{d}} - e^{\frac{x-x_0}{d}}} \cdot T_m(x)'$$

wherein $T_m(x)'$ is the detected film thickness at the detection point x, $T_r(x)'$ is the real film thickness at the detection point x, and d is the film thickness measuring correction factor.

10. The method as in claim 9, wherein the measured film thickness of the film on the edge of the wafer is corrected by a formula:

$$T_r(x) = \frac{e^{\frac{x_0-x}{d}} + e^{\frac{x-x_0}{d}}}{e^{\frac{x_0-x}{d}} - e^{\frac{x-x_0}{d}}} \cdot T_m(x)$$

in which $T_m(x)$ is the measured film thickness of the film on the edge of the wafer, $T_r(x)$ is the real film thickness of the film on the edge of the wafer, and d is the film thickness measuring correction factor.

11. The method as in claim 8, wherein the film thickness measuring correction factor is obtained by a formula:

$$T_r(x)' = \frac{\sqrt{\pi} \cdot T_m(x)'}{2\int_0^{\frac{x_0-x}{d}} e^{-t^2} dt}$$

in which $T_m(x)'$ is the detected film thickness at the detection point x, $T_r(x)'$ is the real film thickness at the detection point x, d is the film thickness measuring correction factor, and t is an integral variable ranging from 0 to $$\frac{x_0 - x}{d}.$$

12. The method as in claim 9, wherein the measured film thickness of the film on the edge of the wafer is corrected by a formula:

$$T_r(x) = \frac{\sqrt{\pi} \cdot T_m(x)}{2\int_0^{\frac{x_0-x}{d}} e^{-t^2} dt}$$

in which $T_m(x)$ is the measured film thickness of the film on the edge of the wafer, $T_r(x)$ is the real film thickness of the film on the edge of the wafer, and d is the film thickness measuring correction factor.

* * * * *